United States Patent Office 3,644,283
Patented Feb. 22, 1972

3,644,283
AROMATIC AZO BLOCK COPOLYMERS
Hartwig C. Bach, Pensacola, Fla., assignor to
Monsanto Company, St. Louis, Mo.
No Drawing. Continuation-in-part of abandoned application Ser. No. 715,161, Mar. 22, 1968. This application Aug. 20, 1970, Ser. No. 65,711
Int. Cl. C08g 20/20, 20/32, 33/02
U.S. Cl. 260—47 CZ
5 Claims

ABSTRACT OF THE DISCLOSURE

Aromatic azo block copolymers having an azo group containing wholly aromatic block polymer unit and a second wholly aromatic non-azo block polymer unit are prepared and are useful in the preparation of fibers, filaments, films and other shaped articles for application where thermal resistance, light stability, semi-conducting and photochromic properties are desired.

CROSS REFERENCE TO RELATED APPLICATION

The present invention is a continuation-in-part application of application Ser. No. 715,161, filed Mar. 22, 1968 and now abandoned.

BACKGROUND OF THE INVENTION

This invention pertains to wholly aromatic azo block copolymers prepared preferably by oxidative coupling, of primary aromatic amine terminated compounds.

Polymers containing azo linkages are well known in the prior art. Such polymers have been obtained by diazonium coupling of bis-diazonium salts with phenols, the polymers necessarily containing phenolic hydroxy groups in o- or p-position to the azo linkage and by treatment of aromatic diamines with free radicals such as the t-butoxy radical to produce azopolymers containing the radical as a randomly distributed substituent to the polymer chain. Polyaryl polymers have been obtained by decomposition of bisdiazonium salts and consist mainly of chains of aromatic rings with a random incorporation of some azo groups.

SUMMARY OF THE INVENTION

In general, this invention provides compositions of matter consisting of new and novel aromatic azo block copolymers wherein both blocks are essentially wholly aromatic. At least one of the blocks should be of relative high molecular weight or disordered. A preferred method for the preparation of these compositions is by means of oxidative coupling of one or more primary aromatic amine terminated compounds. Advantages offered by this method of preparation of polymers are that high molecular weight may be obtained without regard to stoichiometry and with a minimum of by-product formation. By suitable choice of components and proportions of reactants, it is possible to obtain products having many advantages over prior known aromatic polymers with respect to physical properties. These aromatic azo block copolymers have an ordered sequence of regularly recurring block structural units and contain azo groups in each regularly recurring copolymer structural unit which may be represented by the general formula {A—B}.

DESCRIPTION OF PREFERRED EMBODIMENTS

This invention relates to compositions of matter consisting of aromatic azo block copolymers which may be illustrated in the simplest form by the general formula {AB}, as pointed out above, in which:

A is a block consisting of wholly aromatic carbocyclic and/or heterocyclic units and containing one or more azo linkages in the chain and B is a block consisting of wholly aromatic carbocyclic and/or heterocyclic units.

The blocks A and B can be of high or low molecular weight and can have a monodisperse or a random molecular weight distribution; they are by no means limited to a certain molecular weight range. They may encompass blocks of fairly high molecular weight (several thousand) with the only limitation being that the azo linkage be recognizable as part of the final polymer chain. Furthermore, the polymers may also contain wholly aromatic carbocyclic and/or heterocyclic blocks of relatively low molecular weight which have a random molecular weight distribution. Polymers of the above general formula could also include in the same polymer chain, repeat units which differ in the ratio of azo groups (in A) to the molecular weight of blocks B. Since the A and B segments of one unit AB may be the same as or different from the A and B segments of other units, with respect to molecular weight, the polymer chain structure may be more completely defined by the following formula:

$${AB} {A'B'} [A''B''] \cdots \cdots A^{m'}B^{n'}$$

Since these polymers have an overall molecular weight at least sufficient for film formation the inherent viscosity thereof must be above about 0.2 as measured from a solution of 0.5 gram of polymer in 100 ml. of dimethyl-acetamide containing 5% dissolved lithium chloride at 30° C. In the polymers of this invention, the A and B segments comprising a chain unit are typically illustrated by:

A=(Ar N=N)$_y$Ar' and
B=ArAr' wherein Ar and Ar' may be of high or low molecular weight and may be the same or different but must consist of one or more aromatic carbocyclic or heterocyclic single, multiple or fused ring system characterized by benzenoid unsaturation and y is an integer of from 1 to 10. The nitrogens of the azo group in A must be bonded to carbon atoms which are a part of an aromatic or hetero ring. It can be seen that B may conceivably be the same as A exclusive of the azo group. In the above formula Ar and Ar' can contain optionally linkages other than carbon-carbon, such as

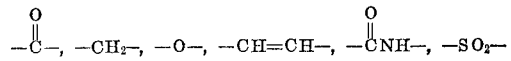

and the like. At least one of the linkages must be other than a carbon-carbon bond.

The polymers of this invention can be obtained by a number of methods; in a preferred method, they are obtained by polymerization of units such as H$_2$NArBAr'NH$_2$ by an oxidative coupling process.

The process generally consists of the oxidative solution polymerization of the corresponding block diamine or diamines by a catalyst system comprising a cupric ion complexed with a nitrogen base such as a tertiary amine or an N,N'-dialkylamine.

Another suitable method is by conventional solution polycondensation of appropriate diamines (at least one of which contains an azo bond) with diacid chlorides. The two methods are illustrated by the following equations:

(A) Oxidative Coupling Method

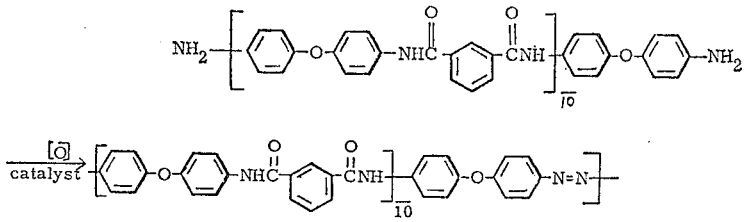
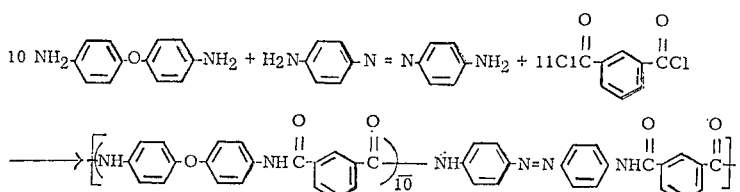

(B) Conventional polycondensation

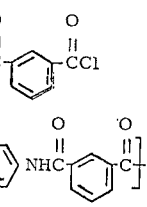

NOTE.—$\overline{10}$ in the structures above denotes a number average chain length; i.e. the average of several possible chain lengths.

Both of the above methods were used for obtaining the compositions of matter of this invention and are demonstrated experimentally in the examples of this disclosure.

Aromatic primary diamines, from which the azo block copolymers of this invention can be formed by oxidative coupling are typically illustrated by the formula:

$$NH_2ArBAr'NH_2$$

wherein B represents the structure Ar—X—Ar', Ar represents one or more aromatic ring nuclei, and X represents units selected from (1) (YAr)m
(2) (YHet)m
(3) (Het)nAr where Y is a nucleus connecting linkage "Het" is a multi-member heterocyclic ring nucleus whose hetero members are selected from O, N, S, $n$ and $m$ are integers; Ar' is an aromatic ring nucleus. The term "aromatic ring" as used herein is intended to refer to any "aromatic ring system" which is of the benzene or heterocyclic type.

The radicals of the benzene type may be any single, multiple, or fused ring system characterized by benzenoid unsaturation. Such aromatic radicals may be derived, for example, from benzene, naphthalene, diphenyl alkanes such as diphenyl methane, other bridged diphenyls such as diphenyl sulfone, diphenyl ether and the like, and the corresponding substituted compounds in which one or more of the aromatic rings contains a substituent such as lower alkyl, halogen, nitro, and the like. When using the oxidative coupling method, substituents which either destroy the catalyst or acid groups, if present in at least equivalent ratio to the catalyst species, or substituents—other than the two amino groups in the general formula shown of the block diamine—which are oxidatively coupled by the catalyst, thus leading to crosslinking or branching, should only be present to a minimal degree.

The nucleus connecting linkage is preferably selected from —O—, —(CH$_2$)$_x$—, —S—, —SO$_2$—, —CH=CH—, —C—, and a valence bond, where $x$ is a small whole number of about 4 or less.

Examples of classes of compounds that are useful as a part of or in the preparation of the above general diamine structure are typically illustrated as follows.

A preferred class of compounds are the aromatic primary diamines such as for example m-phenylenediamine, p-phenylenediamine, 4,4'-diaminodiphenyl methane, 4,4'-diaminodiphenyl sulfone, 4,4'-diamino-diphenyl ether and the like.

Another illustrative class of useful diamines are those of the formula NH$_2$ArYArYArNH$_2$. Such diamines include for example N,N'-bis(p-aminophenyl) isophthalamide, N,N' - bis(m-aminophenyl)bibenzamide and the like.

Yet another closely related class of useful diamines are those that are products of the reaction of the above diamines with aromatic diacid chlorides, such as those typically illustrated by the formula:

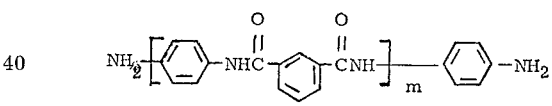

Another class of diamines useful in the practice of the invention are heterocyclic diamines. Suitable heterocyclic nuclei include for example pyridine, 1,3,4-thiadiazole, 1,3,4-oxadiazole, pyrazine, thiazole, bis-benzoxazole and the like. An example of such diamines is 2,6-diaminopyridine.

Another useful class of heterocyclic diamines are those of the general formula NH$_2$Ar-Het-ArNH$_2$ such as, for example, 2,5 - bis(p-aminophenyl)-1,3,4-oxadiazole, 4,4'-bis(p-aminophenyl)-2,2'-bithiazole and others containing similar heterocyclic linkages between two amines terminated aromatic groups. An example of such diamines is

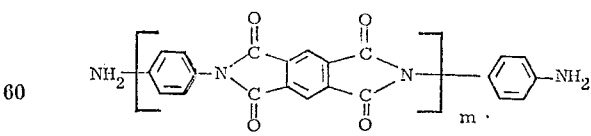

Additional classes of compounds are those in which the Ar's are any desired alternating arrangement of aromatic carbocyclic and heterocyclic nuclei such as for example

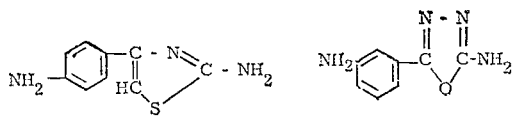

Yet another illustrative class of compounds that may be used in this invention are those of the formula NH₂—Het(Y Het)ₘNH₂ wherein Het, Y, and *m* have the significance previously indicated. Typical members illustrative of this class of compounds are

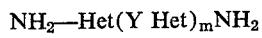

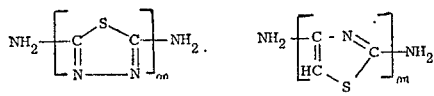

and

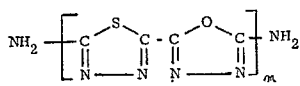

The following examples are presented as a further illustration of the invention. In the examples all parts and percents are by weight unless otherwise indicated and all inherent viscosities were obtained from 0.5 gram of polymer in 100 ml. of dimethylacetamide containing 5% dissolved lithium chloride at 20° C.

EXAMPLE I

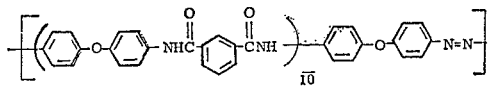

A block diamine ($\overline{MW}$ 3500) was prepared by low-temperature solution polycondensation in dimethylacetamide (DMAc) from 0.0055 mole (1.10 grams) of oxydianiline and 0.005 mole (1.015 grams) of isophthaloyl chloride. The inherent viscosity of the polymeric block diamine was 0.28.

A 1.0 ml. aliquot of catalyst solution (prepared by oxidation with oxygen of 0.25 gram of Cu₂Cl₂ in 10 ml. of pyridine), and 0.5 ml. of pyridine were added to a solution of 0.5 gram of the block diamine in 9 ml. of dimethylacetamide. The resulting reaction mixture was stirred in an oxygen atmosphere in a closed system attached to an oxygen buret. During a period of 320 minutes, 4.5 ml. of oxygen was absorbed. After standing for 64 hrs., the reaction mixture gelled. On addition of ml. of DMAc/10% LiCl, however, a fluid viscous dope was obtained.

A strong, flexible, hot drawable (at 230° C.) film and a crude fiber were obtained from this dope. Inherent viscosity of the coagulated polymer was 2.86.

EXAMPLE II

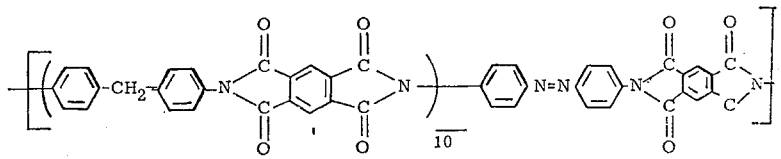

Pyromellitic dianhydride (1.166 grams, 0.0055 mole) was added at 0° C. to a slurry of 0.99 gram (0.005 mole) of methylene dianiline and 0.106 gram (0.0005 mole) of 4,4'-azodianiline in 12.6 ml. of anhydrous DMAc. The mixture was stirred under nitrogen for 2 hours at 0° C., and then for 19½ hours at 25° C. Inherent viscosity of the amic-acid polymer was 0.47.

Part of the dope was cast to a film, which was converted to the polyimide by heating for 2 hours at 140° C., and 1½ hours at 200° C. The film obtained was orange, tough, and flexible.

EXAMPLE III

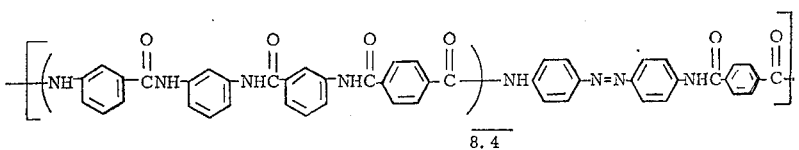

Terephthaloyl chloride (0.95 gram, 0.0047 mole) was added at 0° C. to a solution of 1.454 (0.0042 mole) of N,N'-m-phenylene-bis(m-amino benzamide) and 0.106 gram (0.0005 mole) of 4,4'-azo-dianiline in 11.4 ml. of anhydrous DMAc/5% LiCl. The mixture was stirred at 0° C. for 30 minutes, and at 25° C. for 60 minutes. The red dope was then neutralized by the addition of 0.225 gram (0.0094 mole) of LiOH. A strong, flexible, yellow film was cast from the dope. The coagulated polymer had an inherent viscosity of 0.6.

A hot-drawn (270° C.) film still retained its strength after exposure in air for 9 days at 300° C.

EXAMPLE IV

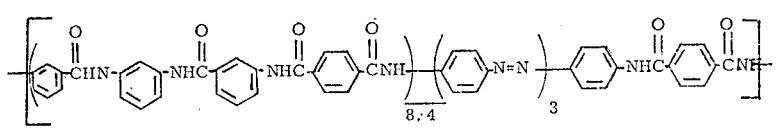

Terephthaloyl chloride (0.954 gram, 0.0047 mole) was added at 0° C. to a solution of 1.454 gram (0.0042 mole) of N,N'-m-phenylene-bis(m-amino benzamido) and 0.210 gram (0.0005 mole)

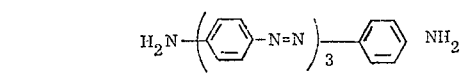

The mixture was stirred for 20 minutes at 0° C. and for 5 hours at 25° C.; it was then neutralized with 0.225 gram (0.0094 mole) of LiOH. A strong, tough, red film was cast from the dope. The coagulated polymer had an inherent viscosity of 0.93.

A hot-drawn (260° C.) film strip retained excellent strength and flexibility after exposure in air at 300° C. for 9 days.

These polymers are useful in a wide variety of textile applications employing fibers, filaments and other fabricated articles. In the form of films they are useful in end uses where light stability, thermal stability and photochromic properties are desired.

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to be included within the scope of the claims.

I claim:

1. An aromatic azo block copolymer with an inherent viscosity of above about 0.2 as measured from a solution of 0.5 gram of polymer in 100 ml. of N,N-dimethylacetamide containing 5% dissolved lithium chloride at 30° C. consisting essentially of the recurring structural formula

{A—B} wherein A is an aromatic block polymer unit (ArN=N)yAr' and B is an aromatic block polymer unit ArAr' wherein Ar and Ar' consist of at least one aromatic carbocyclic or heterocyclic single, multiple or fused ring system characterized by benzenoid unsaturation and are linked to adjacent radicals by means of carbon-carbon bond, $$-\overset{O}{\underset{\|}{C}}-, -CH_2-, -O-, -CH=CH-, -\overset{O}{\underset{\|}{C}}-NH-, \text{ or } -SO_2-$$

with the proviso that at least one of the linkages be other than a carbon-carbon bond and with the priviso that the heterocyclic rings are five or six member rings wherein the hetero atoms are selected from the group consisting of oxygen, sulfur, nitrogen and mixtures thereof and y is an integer of from 1 to 10.

2. An aromatic azo block copolymer with an inherent viscosity of above about 0.2 as measured from a solution of 0.5 gram of polymer in 100 ml. of N,N-dimethylacetamide consisting essentially of the recurring structural formula

{A—B} wherein A is

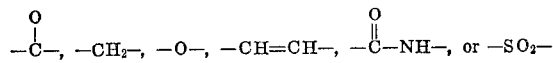

and B is

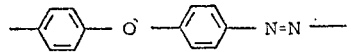

3. An aromatic azo block copolymer with an inherent viscosity of above about 0.2 as measured from a solution of 0.5 gram of polymer in 100 ml. of N,N-dimethylacetamide consisting essentially of the recurring structural formula

{A—B} wherein A is

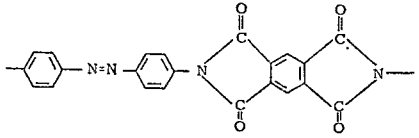

and B is

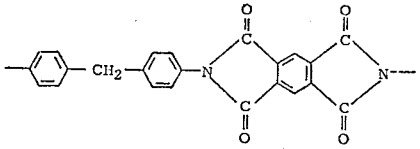

4. An aromatic azo block copolymer with an inherent viscosity of above about 0.2 as measured from a solution of 0.5 gram of polymer in 100 ml. of N,N-dimethylacetamide consisting essentially of the recurring structural formula

{A—B} wherein A is

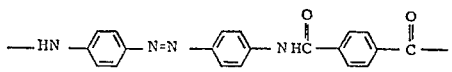

and B is

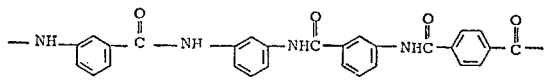

5. An aromatic azo block copolymer with an inherent viscosity of above about 0.2 as measured from a solution of 0.5 gram of polymer in 100 ml. of N,N-dimethylacetamide consisting essentially of the recurring structural formula

{A—B} wherein A is

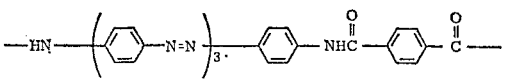

and B is

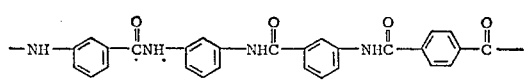

References Cited

UNITED STATES PATENTS 2,994,693   8/1961   Blake et al. _____ 260—144
3,455,879   7/1969   Gay et al. _____ 260—47

HAROLD D. ANDERSON, Primary Examiner

L. L. LEE, Assistant Examiner

U.S. Cl. X.R.

260—2 R, 32.6 N, 47 CP, 78 R, 78 TF, 857 R